United States Patent [19]

Curry

[11] Patent Number: 4,872,348
[45] Date of Patent: Oct. 10, 1989

[54] SIGNAL ADDED VIBRATION TRANSDUCER
[75] Inventor: Stephen J. Curry, Bridgeport, Conn.
[73] Assignee: Avco Corporation, Providence, R.I.
[21] Appl. No.: 149,376
[22] Filed: Jan. 28, 1988
[51] Int. Cl.[4] .............................................. G01P 15/03
[52] U.S. Cl. ......................................... 73/653; 73/654
[58] Field of Search .......... 73/652, 653, 654, 517 AV, 73/517 R

[56] References Cited

U.S. PATENT DOCUMENTS

| | | | |
|---|---|---|---|
| 2,928,668 | 3/1960 | Blasingame | 73/654 |
| 2,942,456 | 6/1960 | Hardway, Jr. | 73/654 |
| 3,281,743 | 10/1966 | Anderson | 73/654 |
| 3,604,940 | 9/1971 | Matthews . | |
| 3,646,818 | 3/1972 | Little et al. | 73/517 R |
| 3,709,030 | 1/1973 | Aselman . | |
| 3,905,224 | 9/1975 | Himmler . | |
| 4,051,718 | 10/1977 | Meckl | 73/654 |
| 4,321,464 | 3/1982 | Miller . | |
| 4,322,829 | 3/1982 | Davis, Jr. et al. | 73/653 |
| 4,379,226 | 4/1983 | Sichling et al. | 73/653 |
| 4,414,840 | 11/1983 | Yamaguchi | 73/654 |
| 4,446,741 | 5/1984 | Sikorad et al. | 73/654 |
| 4,466,295 | 3/1984 | Wesson . | |
| 4,471,659 | 9/1984 | Udd . | |
| 4,500,979 | 2/1985 | Scott | 73/653 |
| 4,531,414 | 7/1985 | Kraus | 73/653 |
| 4,649,748 | 3/1987 | Fukano et al. | 73/653 |

FOREIGN PATENT DOCUMENTS 0532821 10/1976 U.S.S.R. ................. 73/654

Primary Examiner—John Chapman
Assistant Examiner—Lawrence Fess
Attorney, Agent, or Firm—Perman & Green

[57] ABSTRACT

A transducer for measuring vibrations is formed of a case with a vibratory element mounted therein by means of a disk spring which is constrained to vibrate with the vibratory element in a single direction. Optical or magnetic sensors are located in registration with opposed ends of the vibratory element to produce optically or magnetically induced signals having a modulation thereon resulting from vibration of the vibratory element. The use of pairs of the sensors improves signal-to-noise ratio while allowing for increased bandwidth of the transducer in the measurement of vibration.

10 Claims, 5 Drawing Sheets

FIG. 5.
FIG. 6.
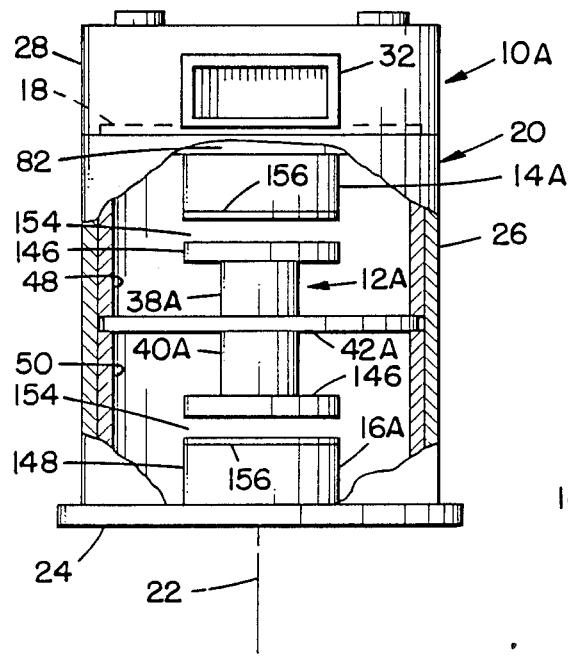
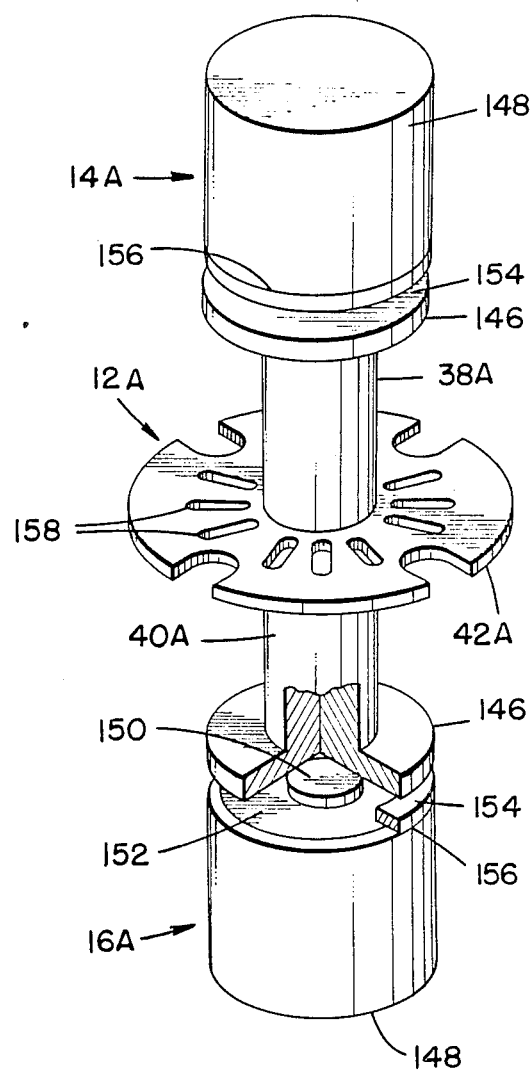

SIGNAL ADDED VIBRATION TRANSDUCER

BACKGROUND OF THE INVENTION

This invention relates to vibration transducers for measurement of mechanical vibrations such as vibrations of machinery and, more particularly, to a vibration transducer sensitized to respond to a vibrational component along a single axis of vibration, and including dual optical sensors allowing increased bandwidth of spectral measurement while preserving good signal-to-noise ratio.

Vibration transducers are widely used for measuring vibrations, one important use of the vibration transducer being in the measurement of vibrations produced by machinery. By way of example, a turbine produces vibrations having a number of spectral components which introduce a signature to the vibration, which signature can be identified to indicate proper operation of the turbine. An output electric signal of the transducer may be applied to a spectrum analyzer for identification of specific spectral components and for measurement of the amplitude of the spectral components. The relative magnitude of the spectral components can be used to identify mechanical components, such as gears of a gear train, to determine the proper operation of the mechanical components and the detection of a fault in the operation of the turbine.

In the construction of a vibration transducer, a vibratory element having a predetermined mass is suspended on a spring having a predetermined stiffness. The mass and the stiffness determine a resonant frequency of the vibratory element. By placing the resonant frequency at a value significantly lower than the spectrum to be measured, the transducer responds to displacement of a vibrating object to which the transducer has been affixed for measurement of vibration. By placing the resonant frequency significantly above the spectrum of vibration to be measured, the transducer becomes responsive to acceleration of the vibrating object to which the transducer has been affixed for measurement of vibration. Acceleration or displacement signals produced by the transducer can be integrated or differentiated, respectively, to provide velocity information relative to vibrations of the vibrating object.

A situation of particular interest is the measurement of wide-band vibrations of the vibrating object under observation with a transducer sensitive to acceleration. In such situation, the mass of the vibrating element is minimized and the stiffness of the suspending spring is maximized to increase the resonant frequency of the vibratory element. However, the increased resonant frequency introduces a problem with such a mechanical arrangement in that the excursions in position of the vibratory element, induced by vibrations of the object under observation, are significantly reduced in amplitude from that which would be obtained by use of a larger mass in the vibratory element and softer spring in the suspension. For example, in the case of a transducer employing an optical sensor of displacement of the vibratory element, reduction in the excursion of the vibratory element reduces output signal strength from the sensor with a consequent reduction in signal-to-noise ratio and a loss of information about vibrations of the object under observation. A further problem is the introduction of cross-coupling of energies from one vibrational mode to another vibrational mode which tends to obfuscate information attainable by observation of a single selected axis of vibration.

SUMMARY OF THE INVENTION

The foregoing problems are overcome and other advantages are provided by a vibrational transducer constructed in accordance with the invention. The transducer of the invention attains a desired wider bandwidth with improved signal-to-noise ratio, and also constrains vibrational displacement of a vibratory element of the transducer along a single direction in accordance with a selected axis of vibration to be observed.

In a preferred embodiment of the invention, the vibratory element is enclosed within a case, and is mounted upon a disk spring secured to an interior wall of the case. The vibratory element can vibrate only in a direction normal to the plane of the disk spring. The planar configuration of the spring and a secure mounting of the spring to the case inhibits other directions of vibration. A pair of optical sensors are mounted to the case in registration with opposite ends of the vibratory element. Each end of the vibratory element is provided with a vane which intercepts a portion of a beam of light produced by an optical sensor. Each vane protrudes partway into a light beam and, upon vibration in a direction normal to a plane of the disk spring introduces a sinusoidal modulation to the strength of the light beam. The modulation is of opposite phase in the two optical sensors due to the fact that the forward movement of one vane into the light beam at one end of the vibratory element is accompanied by a backward movement and retraction of the vane from the light beam of the opposite sensor. The two sensors are connected to electrical circuitry which combines their out-of-phase signals algebraically to reduce the sum of the two signals, thereby increasing the signal-to-noise ratio.

In an alternative embodiment of the invention, the optical sensors are replaced with a pair of sensors, each constructed of a magnet and a coil of wire which is linked by magnetic flux of the magnet. End portions of the vibratory element are located within the flux paths, and are spaced apart from the magnet by a gap. Vibration of the vibratory element imparts a sinusoidal variation to the width of the gap with a consequential inducement of an electric current and voltage within the coil of each sensor. Output signals of the coils are combined algebraically to sum the two signals for increased signal-to-noise ratio. I view of the fact that the voltage induced in a coil is proportional to the rate of change of flux, the voltage induced in each coil is proportional to the derivative of the vibrational displacement. Accordingly, by operating the vibratory element at a low resonant frequency for displacement responsivity, the coils differentiate the sensed displacement to provide velocity data of the vibration.

BRIEF DESCRIPTION OF THE DRAWING

The foregoing aspects and other features of the invention are explained in the following description, taken in connection with the accompanying drawing wherein:

FIG. 5 is a side elevation view of an alternative embodiment of the transducer, a sidewall of the transducer being partially cut away to expose an alternative embodiment of vibratory element and vibration sensor;

FIG. 6 shows a configuration of the transducer in an alternative embodiment employing magnetic sensors, a lower end of the vibratory element and a front layer of a lower sensor being partially cut away to show interior components of the sensor;

DETAILED DESCRIPTION

Figure 1:
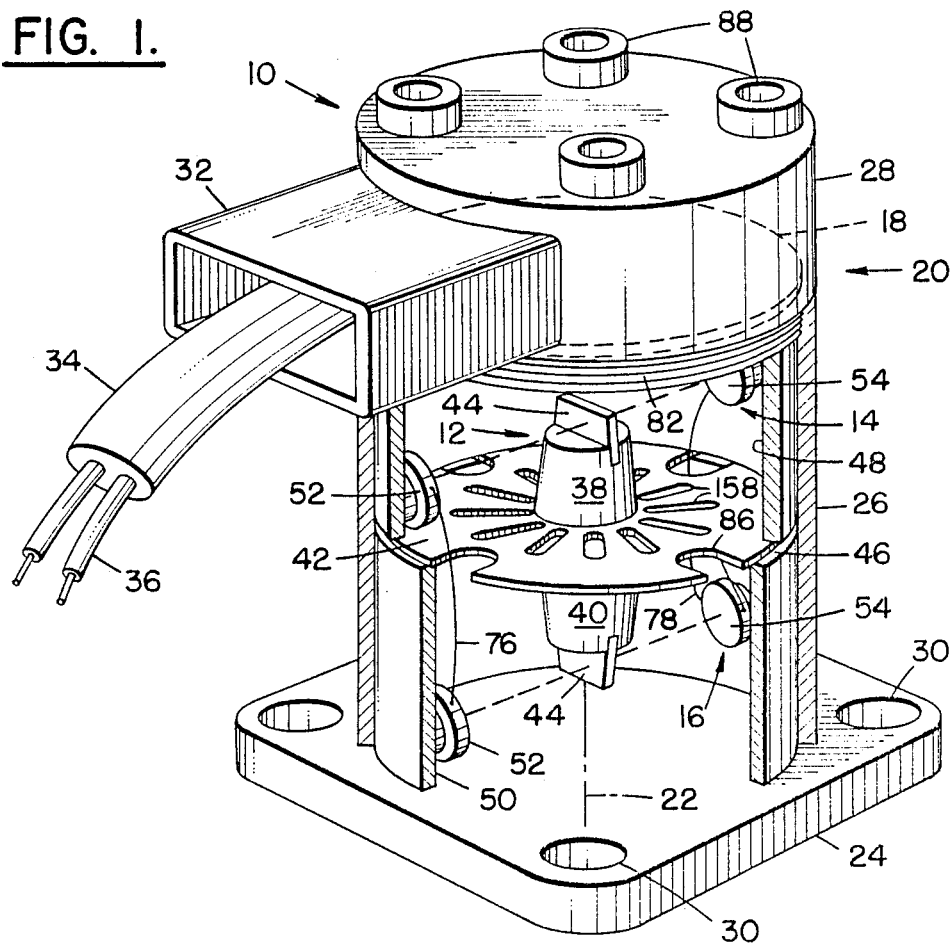
FIG. 1 is a perspective view of a first embodiment of the vibrational transducer of the invention, the transducer being partially cutaway to show a vibratory element and a pair of optical sensors located in registration with ends of the vibratory element.
Figure 2:
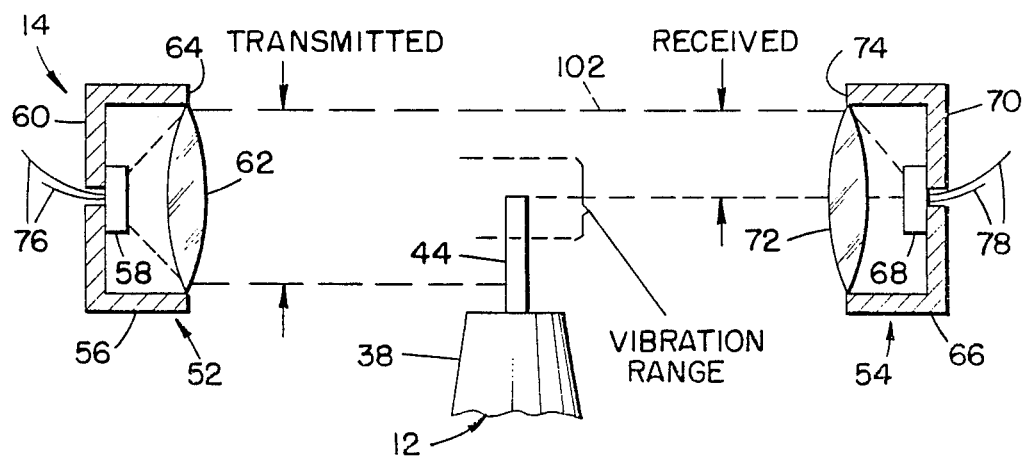
FIG. 2 shows diagrammatically the configuration of an optical sensor of the transducer of FIG. 1.
Figure 3:
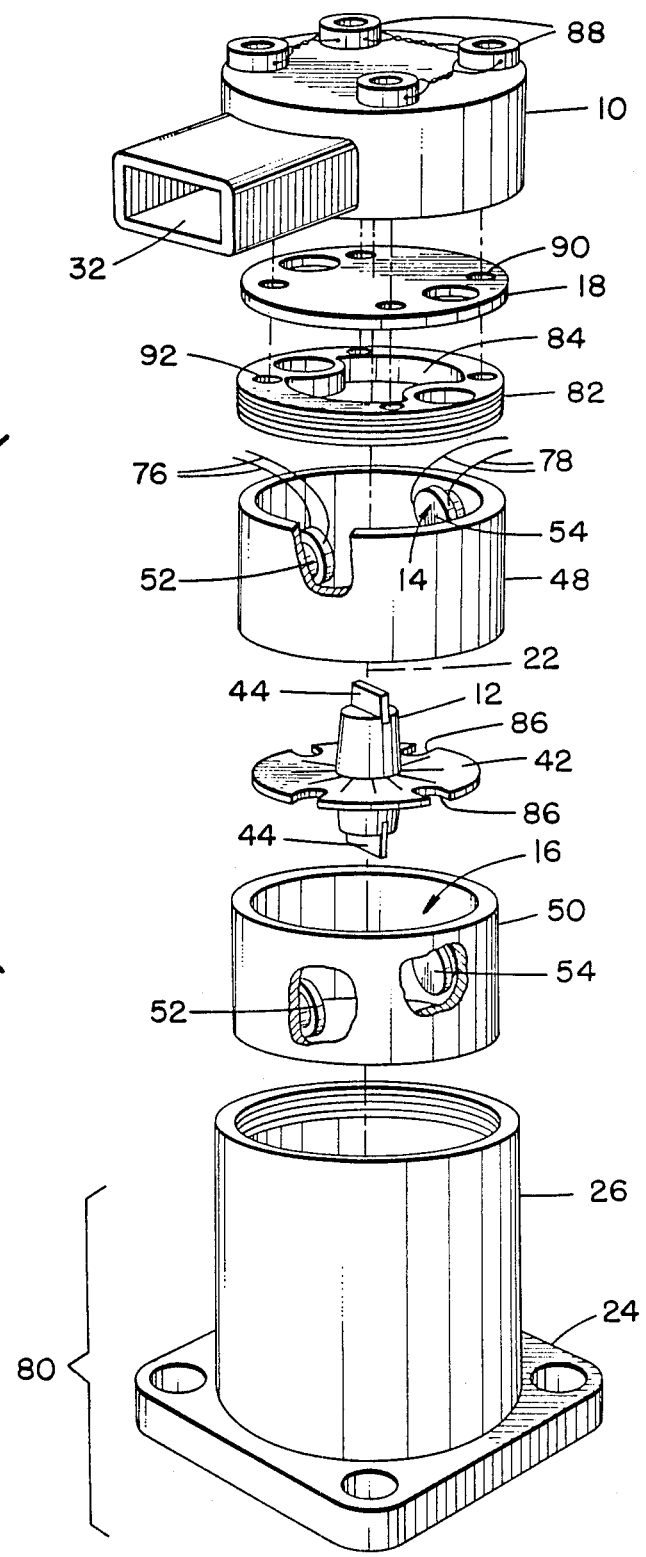
FIG. 3 is an exploded view of the transducer of FIG. 1.

FIGS. 1, 2, and 3 show a vibration transducer 10 constructed in accordance with the invention. The description of the construction of the transducer 10 applies to velocity and displacement transducers as well as accelerometers, the stiffness of a spring and mass of vibratory element (to be described hereinafter) being determination of the type of transducer. The transducer 10 includes a vibratory element 12, an upper vibration sensor 14, a lower vibration sensor 16, and an electric circuit board 18 enclosed within a case 20. The vibration sensors 14 and 16 may be responsive to displacement of the vibratory element 12 along a central longitudinal axis 22 of the case 20 as disclosed in FIGS. 1-3 or, alternatively, may be responsive to the velocity of the vibratory element 12 along the axis 22 as shown in an alternative embodiment in FIGS. 5-6. The case 20 is to be secured to a vibrating object such as machinery, not shown, producing vibrations which are to be measured by use of the transducer 10.

The case 20 comprises a base 24 with a cylindrical sidewall 26 upstanding thereon, and a cap 28 attached to the upper end of the sidewall 26 for closing off the interior of the case 20. The base 24 is provided with a set of apertures 30 through which mounting bolts, not shown, are passed for securing the transducer 10 to a vibrating object, not shown, for the measurement of vibrations from the object. Included within the cap 28 is a port 32 allowing egress of an electric cable 34 making electrical connections between the circuit board 18 and an external vibration meter, not shown, of well-known configuration to be used with the transducer 10 in the measurement of vibrations from a vibrating object. By way of example, two conductors 36 are shown within the cable 34, it being understood that more conductors are included within the cable 34 as will become apparent from a description of circuitry of the circuit board 18, hereinafter.

The vibratory element 12 comprises a pair of opposed pedestals 38 and 40 mounted upon opposite sides of a spring 42, the spring 42 being formed as a disk-shaped plate. The pedestals 38 and 40 are located along the axis 22, have circular cross-section, and are tapered away from the spring 42 to provide a shape of a frustum of a cone. Vanes 44 are carried by the pedestals 38 and 40, and extend from opposed outer ends of the pedestals 38 and 40 along the axis 22. The spring 42 is held in a plane transverse to the axis 22 within a gap 46 between inner circumferential liners 48 and 50 which are set contiguous the inner surface of the sidewall 26. The liners 48 and 50 securely hold the spring 42 in position and constrain all vibrations thereof to transverse vibrations along the axis 22. Vibration from the aforementioned vibrating object is coupled via the case 20 and the liners 48 and 50 to the vibratory element 12 resulting in a vibrational displacement of the pedestals 38 and 40 along the axis 22 and transverse to a plane of the gap 46. Peripheral regions of the spring 42 are constrained by the liners 48 and 50 to vibrate in unison with vibrations of the case 20, while the central portion of the spring 42 is free to vibrate with larger or smaller excursions and with phase shift dependent on resonance of the vibratory element 12, which resonance is dependent on the mass of the element 12 and the stiffness of the spring 42.

The two sensors 14 and 16 have the same construction, the construction of the sensor 14 being shown in detail in FIG. 2, the description thereof being understood to apply also to the sensor 16. The sensor 14 comprises a light emitting source 52 and a light receiver 54, the source 52 and the receiver 54 being positioned diametrically across from each other and mounted on the inner surface of the upper liner 48. Similarly, in the sensor 16, a light source 52 and a light receiver 54 are mounted diametrically across from each other upon the lower liner 50. The light source 52 comprises a housing 56, a light-emitting diode 58 or similar generator of radiant energy centered within the housing 56 and located on a back wall 60 thereof, and a lens 62 held within a front rim 64 of the housing 56. In typically commercially-available light sources, the lens 62 and the rim 64 are integrally formed as part of the housing 56, the showing in FIG. 2 being provided by way of explanation of the construction of the invention. The light receiver 54 comprises a housing 66, a photodetector 68 centered within the housing 66 and located on a back wall 70 thereof, and a lens 72 held within a front rim 74 of the housing 66. Here too, in typical commercially-available light receivers the lens 72 is formed as a lens cover of the housing 66. Light emitted by the diode 58 is collimated by the lens 62 and directed by the lens 62 past the vane 44 to impinge upon the lens 72 of the receiver 54. The lens 72 focuses the light upon the detector 68. As used herein, the term light is understood to include radiation other than visible light, such as infrared radiation, which may be transmitted between the source 52 and the receiver 54.

As shown in FIG. 2, the vane 44 extending from the pedestal 38 protrudes partway into the beam of collumated light rays transmitted between the source 52 and the receiver 54. During vibration of the vibratory element 12, the amount of protrusion of the vane 44 varies over a range of values of displacement of the element 12, a typical range of vibration being indicated in the figure. In this way, the pedestal 38 with the vane 44 acts as a shutter for modulating the beam of light. The vane 44 blocks off a portion of the light beam causing a reduction in the strength of the beam received as compared to the strength of the beam transmitted. A bundle of transmitted rays and a bundle of received rays are indicated in the figure, the bundle of received rays being smaller than the bundle of the transmitted rays. During vibration of the element 12, the optical power of the received beam is modulated by the vane 44 with a sinusoidal modulation due to the sinusoidal displacement of the vane 44 during vibration of the element 12 relative to the transducer case. Also shown in FIG. 2 are electrical leads 76 and 78 connecting respectively with the diode 58 and the detector 68.

Assembly of the transducer 10 is shown in FIG. 3 wherein the sidewall 26 is affixed to the base 24 to serve as a container 80 for receiving the components of the transducer. The lower vibration sensor 16 comprising source 52 and receiver 54 are secured to the interior of the lower liner 50, the source 52 and the receiver 54 being seen by cutout portions of the lower liner 50. Securing of the source 52 and the receiver 54 to the liner 50 is accomplished by conventional means, such as by brackets (not shown). The interior surface of the liner 50, as well as the liner 48, may be coated with a nonreflecting optical coating or paint to prevent any stray light from being reflected to a receiver 54. The upper vibration sensor 14 is inserted into an upper liner 48 by affixing the source 52 and the receiver 54 to the interior surface of the liner 48 by conventional means, as by brackets (not shown).

The lower liner 50 with the lower sensor 16 therein is inserted into the container to rest upon the base 24. Then the vibratory element 12, constituting the spring and shutter assembly, is inserted into the container 80 with peripheral edge of the spring 42 resting upon the top edge of the liner 50. This is followed by insertion of the upper liner 48 with the upper sensor therein into the container 80, such that the lower edge of the liner 48 rests upon the peripheral edge of the spring 42. The liners 48 and 50 are then tightened against the peripheral edge of the spring 42 by means of a nut 82 which is threaded to an interior portion of the upper end of the sidewall 26. Rotation of the nut 82 urges the liners 48 and 50 together against the spring 42 and clamps these elements against the base 24. Thereupon, the circuit board 18 is placed in the container on top of the nut 82. Leads 76 and 78 from both of the sensors 14 and 16 are conducted upwardly through a passage 84 in the nut 82 to connect with terminals of the circuit board 18. Notches 86 in the peripheral portion of the spring 42 allow for passage of leads 76 and 78 from the lower sensor 16 past the vibratory element 12 for connection with the board 18. Wires 36 in the cable 34 (FIG. 1) are passed through the port 32 of the cap 12 to be terminated at the board 18, after which the cap 12 is secured to the container 80 by means of mounting bolts 88 which pass through the board 18 via apertures 90 to be secured in threaded holes 92 of the nut 82.

Figure 4:
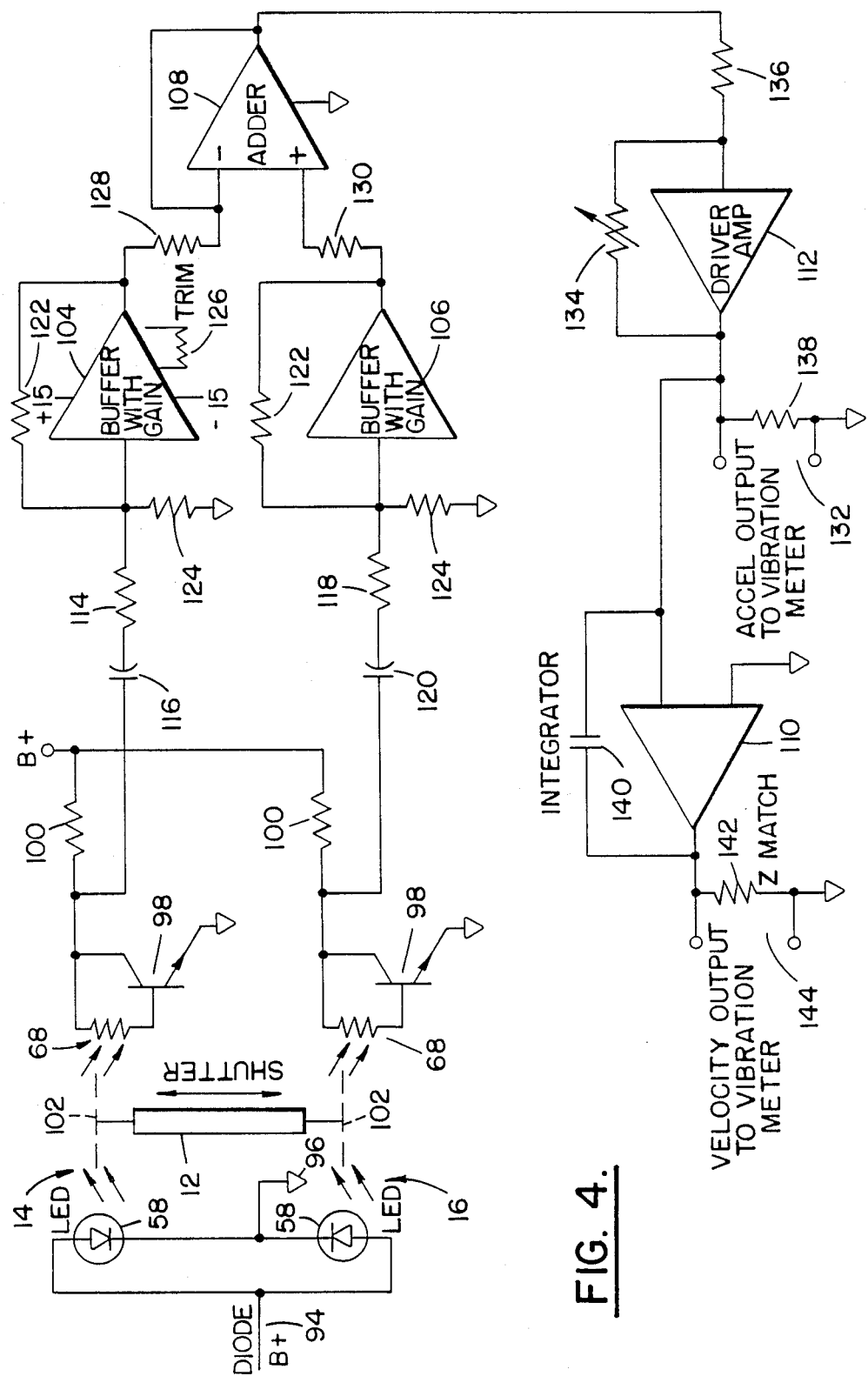
FIG. 4 is a schematic of an electrical circuit included within the transducer on a circuit board of FIG. 3 for combining signals of the optical sensors.

With reference now to FIG. 4, there is shown electrical circuitry for converting output signals of the photodetector 68 of the receiver 54 (FIGS. 1 and 2) of the sensor 14 and of the photodetector 68 of the receiver 54 of the sensor 16 into output signals suitable for operation of a vibration meter. In particular, the circuit of FIG. 4 combines the signals of the two receivers 54 for increased signal-to-noise ratio to provide for more accurate data in a measurement of the vibration.

FIG. 4 shows connection of the diodes 58 of the two sensors 14 and 16 between a terminal of a source of electric power, indicated at 94, and a return terminal, or ground of the power supply indicated at 96. The photodetector 68 of the sensors 14 and 16 are shown as resistive elements connected between base and collector terminals of respective transistors 98 for activating a current flow between collector and emitter terminals of the respective transistors 98 in response to reception of light from the respective diodes 58. Power from the aforementioned power supply is applied to each of the transistors 98 via resistors 100 connected between the respective collector terminals and a terminal of the power supply. Also shown in FIG. 4 is the operation of the vibratory element 12 as a shutter for modulating beams of light 102 transmitted between the diodes 58 and their respective detectors 68. Each of the transistors 98 with its photodetector 68 constitutes one input channel to the circuitry of FIG. 4.

The circuitry of FIG. 4 comprises five operational amplifiers 104, 106, 108, 110 and 112, each of which has power supply terminals shown, by way of example at amplifier 104, as receiving +15 volts and −15 volts. An input terminal of the amplifier 104 is connected by a resistor 114 and a capacitor 116 to the collector terminal of the transistor 98 in the input channel for the sensor 14. An input terminal of the amplifier 106 is connected via a resistor 118 and a capacitor 120 to the collector terminal of the transistor 98 in the input channel for the sensor 16. Each of the amplifiers 104 and 106 include a feedback resistor 122 connected between input and output terminals of the amplifier, and an input resistor 124 connected between the input terminal and the power-supply return terminal. The gain of each of the amplifiers 104 and 106 is established by the ratio of resistance of the two resistors 122 and 124. The gains of the two input channels are equalized by a trim resistor 126 provided with the amplifier 104. The output terminal of the amplifier 104 is connected by a resistor 128 to a negative input terminal of the amplifier 108. The output terminal of the amplifier 106 is connected by a resistor 130 to a positive input terminal of the amplifier 108. The two amplifiers 104 and 106 serve as buffer amplifiers for increasing the signal amplitude and power of each of the input channels, and for applying the channel signals to the amplifier 108. The negative input terminal of the amplifier 108 is connected to its output terminal for operating the amplifier 108 as an impedance transformer for driving the amplifier 112. The two resistors 128 and 130 serve as summing resistors which, by virtue of their connections to the negative and positive input terminals of the amplifier 108, effect an algebraic combination of the two channel signals for subtracting one signal from the other signal.

As may be seen by reference to the shutter of FIG. 4, an upward movement of the vibratory element 12 reduces the light transmitted in the sensor 14 while increasing the light transmitted in the sensor 16. Thus, the sinusoidal signals modulated on to the light beams 102 of the two sensors 14 and 16 are 180 degrees out of phase. The subtraction of the two signals at the amplifier 108 introduces a cophasal relationship between the two channel signals so as to obtain the sum of the two signals for improved signal-to-noise ratio. The output signal of the amplifier 108 is coupled via the amplifier 112 to an output terminal pair 132 of the circuit for connection with a vibration meter (not shown). The amplifier 112 is provided with a variable feedback resistor 134 for adjusting the gain of the amplifier 112, an input resistor 136 connecting an input terminal of the amplifier 112 to the output terminal of the amplifier 108, and an output resistor 138 connected to the output terminal of the amplifier 112 and across the output terminal pair 132. The output terminal of the amplifier 112 is coupled further to an input terminal of the amplifier 110. A capacitor 140 is connected between input and output terminals of the amplifier 110 to provide the function of an integrator. The output terminal of the amplifier 110 connects with an output resistor 142, the terminals of which provide an output terminal pair 144 of the circuit for connection to the aforementioned vibration meter. By way of example, the vibration meter may include a spectrum analyzer for measuring various frequency components in the vibrational motion of the vibratory element 12. The resistors 138 and 142 provide suitable values of output impedance of the amplifiers 122 and 110 for operation of the vibration meter.

In operation, it is noted that the deflection of the spring 42 is dependent upon the force exerted by the case 20 against the vibratory element 12 during vibration. This force is proportional to acceleration of the case 20 relative to the vibratory element 12. Accordingly, the vanes 44 in their action as a shutter modulate the light beams 102 with a modulation proportional to acceleration of the vibrating object which is being tested. The capacitors 116 and 120 couple an alternating component of the optical signals detected by each of the photodetectors 68, the alternating component being the modulation. Thus, the signals outputted at the terminal-pair 132 is a sinusoidal signal having an amplitude proportional to the acceleration of the test object. By integrating the output signal of the terminal-pair 132 by the amplifier 110, there is obtained the velocity of the test object, which velocity is presented as a sinusoidal signal at the terminal-pair 144. Thus, both acceleration and velocity of the object are provided by the circuitry of FIG. 4. It is also noted that, in the construction of the circuitry of FIG. 4, a portion or all of the circuitry may be provided on the circuit board 18 (FIG. 3). The cable 34 (FIG. 1) has a sufficient number of the conductors 36 for connecting power sources to the circuitry, as well as extracting signals from the output terminal-pairs 132 and 144 for connection to the vibration meter. All of the circuitry of FIG. 4 may be located on the circuit board 18. In the event that only a portion of the circuitry is to be located on the circuit board 18, then the transistors 98 and the amplifiers 104 and 106 should be kept on the circuit board 18 to insure adequate power levels to signals outputted on the transducer 10, in which case the circuitry of the amplifiers 108, 110, and 112 would be located externally to the transducer 10.

FIGS. 5 and 6 show a transducer 10A which is an alternative embodiment to the transducer 10 of FIG. 1. In the transducer 10A, a vibratory element 12A is employed in lieu of the vibratory element 12 of FIG. 1. The vibratory element 12A comprises a spring 42A from which extend oppositely directed pedestals 38A and 40A with magnetically conductive plates 146 disposed on the outer ends of the pedestals 38A and 40A. Also, in the transducer 10A, upper and lower vibration sensors 14A and 16A are employed in lieu of the vibration sensors 14 and 16 of the transducer 10. Each of the sensors 14A and 16A operate magnetically, and comprise an outer cylindrical pot core 148 of magnetic material with an upstanding central post 150 of magnetic material. A coil 152 of electrically conductive wire is disposed within the core 148 and surrounds the post 150. The post 150, or alternatively, a unitary assembly of the core 158 and the post 150, is permanently magnetized and produces lines of flux (FIG. 7) which pass through the respective plates 146 by crossing a gap 154 between each of the plates 146 and the corresponding sensors 14A and 16A.

In the construction of the transducer 10A, the pedestals 38A and 40A are aligned along the axis 22, as was disclosed with reference to the transducer 10, and the sensors 14A and 16A also located along the axis 22 facing the plates 146. The upper sensor 14A is secured to the top nut 82 (FIG. 3) and, the lower sensor 16A secured to the base 24. The front surface of each core 148 may be covered with a layer 156 of nonmagnetic magnetically-permeable material such as paper or plastic to prevent contact between a plate 146 and the corresponding core 148 which might occur during a severe vibration or shock. The spring 42A is provided with the notches 86, as was disclosed with reference to the spring 42 of FIG. 1, to allow for passage of electrical leads (not shown in FIGS. 5 and 6) past the spring as was disclosed in FIG. 1.

Figure 7:
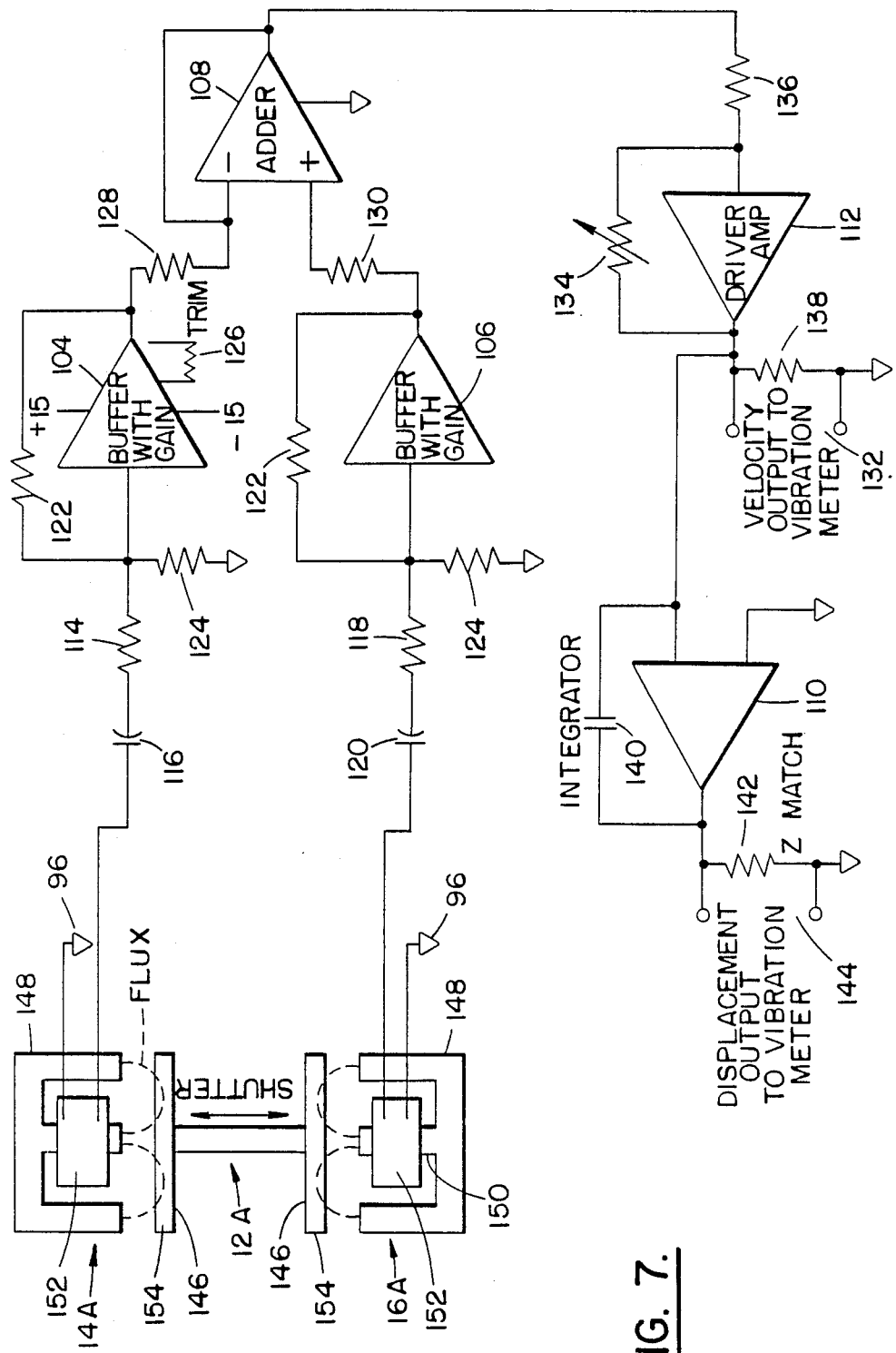
FIG. 7 is an alternative embodiment of the circuit of FIG. 4 for combining signals of the magnetic sensors.

FIG. 7 shows the sensors 14A and 16A in simplified diagrammatic fashion connected with the amplifiers 104-112 previously described with reference to FIG. 4. The sensors 14A and 16A are each represented as an E-shaped magnetic core in which the center leg represents a post 150, there being a coil 152 wound about the post 150. In the upper sensor 14A, terminals of the coil 152 are connected between the power-supply return terminal, or ground, 96 and the capacitor 116. In the lower sensor 16A, terminals of the coil 152 are connected between ground 96 and the capacitor 120. The series circuit of capacitor 116 and resistor 114 interconnect the coil 152 of the sensor 14A with the input terminal of the amplifier 104. The series circuit of capacitor 120 and resistor 118 connect the coil 152 of the sensor 16A to the input terminal of the amplifier 106. It is recognized that the circuits of FIG. 4 and 7 differ with respect to the construction of the sensors, but share the same amplifier circuitry comprising the amplifiers 104, 106, 108, 110, and 112 and their associated resistors and capacitors.

In operation, permanent magnetization of the post 150, or of a unitary assembly of the post 150 with the core 148 provides for a permanent magnetic flux which flows through the core 148 and the post 150, and passes through the gap 154 to flow through the plate 146 facing a sensor 14A, 16A. The vibratory element 12A functions as a shutter during vibrational movement of the element 12A to displace the plates 146 along the axis 22 (FIG. 5) to alter the width of the gap 154 at each of the sensors 14A and 16A, thereby to modulate the resistance to the flow of flux along its path through the core 148 and the plate 146. As is well known, variation of magnetic flux introduces a voltage across the terminals of a coil linked by the flux, and, accordingly, the coils 152 output voltages to the respective amplifiers 104 and 106 in response to motion of the plates 146 relative to the cores 148. The voltage induced in each of the coils 152 is proportional to the rate of change of the flux. Therefore, the voltage is proportional to the velocity of the vibratory element 12A relative to the case 20 of the transducer 10A. As can be readily seen in FIG. 7, a movement of the vibratory element 12, functioning as a shutter, to decrease the gap at the sensor 14A results in an increase in the gap at the sensor 16A. Therefore, sinusoidal voltages induced by sinusoidal vibrational movement of the vibratory element 12A at the sensors 14A and 16A are 180 degrees out of phase with each other. The difference in phase is compensated by the subtraction of the signals at the amplifier 108, in the manner described above with reference to the circuit of FIG. 4, so that the amplifier 108 outputs the sum of the signals produced by the sensors 14A and 16A for increased signal-to-noise ratio. Since the signals produced by the coils 14A and 16A are proportional to velocity of the vibratory element 12A, the amplifier 112 and the terminal pair 132 output a signal proportional to the velocity of the vibratory element 12A. The amplifier 110 provides an integration of this signal to output at the terminal pair 144 a signal proportional to the displacement of the vibratory element 12A relative to the case 20 along the axis 22 (FIG. 5).

In the embodiment of the transducer 10 of FIG. 1, the transducer 10 is to be employed for a broad bandwidth measurement of vibrations of the test object. Since the sensors 14 and 16 are responsive to acceleration of the vibratory element 12, the mechanical resonance of the vibratory element 12 is set at a frequency substantially higher than the band of vibration frequencies which are to be measured. For example, in the case of a measurement of vibrations of a turbine with the transducer 10, a typical value of resonance frequency is 15,000 Hertz. The band of interest for measurement for vibration is in the range of, for example, 5 Hz to 5,000 Hz. The mass of the vibratory element 12 and the stiffness of the spring 42 are selected to produce the resonance frequency of 15,000 Hz. It is noted that the amount of displacement of the vanes 44 along the axis 22 is substantially smaller for a transducer having a relatively high resonance frequency than would be the case for a transducer operating at a lower resonance frequency, the lower resonance frequency allowing for a larger displacement of the vanes 44. A larger displacement is associated with a larger amount of modulation of the light beam 102 in the sensors 14 and 16. Therefore, if the high resonance frequency of 15,000 Hz is not necessary, the resonance frequency can be reduced by reducing the stiffness of the spring 42. This can be accomplished by inserting radially directed apertures 158 (FIGS. 1 and 6) in the spring 42. Also, the mass of the pedestals 38 and 40 can be increased for reduction of the resonance frequency. In the situations wherein the high resonance frequency is desired, the mass of the pedestals 38 and 40 is to be reduced. This can be accomplished by fabricating the pedestals 38 and 40 as hollow bodies, and by reducing the diameters of the pedestals 38 and 40. However, upon reducing the diameters, it is desired to enlarge the base of each pedestal 38 and 40 to add stability to the vibratory element 12 and thereby insure against a cross coupling of transverse modes of vibration with the longitudinal mode of vibration. Such enlargement of the bases of the pedestals 38 and 40 gives the tapered appearance shown in FIG. 1.

For measurements of vibration performed with the transducer 10A, by way of example, the resonance frequency may be set at a lower value, for example 6,000 Hz to provide for a range of measurement out to approximately 2,000 Hz. Such measurement is responsive to relative velocity between the element 12A and the case 20. Useful vibrational information can be obtained over a smaller bandwidth of measurement than with the transducer 10. For reducing the resonance frequency, the resonance pedestals 38A and 40A may be of larger diameter than the pedestals 38 and 40 and, in addition, may be of solid construction rather than the hollow construction employed in the transducer 10.

With either mode of construction, the invention provides for a larger output signal for a given amount of displacement between the vibratory elements and the transducer case. In addition, the transverse vibration of the disk-shaped spring and the overall rigid construction of the vibratory element in cooperation with the secure holding of the peripheral edge of the spring reduces any influence of cross-coupled vibration in the measurement outputted by the transducer.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A vibration measurement transducer comprising:
    an elongated vibratory element having predetermined mass;
    a case enclosing said element;
    suspension means for mechanically coupling the element to said case, the suspension means permitting displacement of said element relative to said case in response to a vibration applied to said case;
    restraining means operatively connected to said suspension means for restraining displacement of said element to one direction of motion parallel to an axis of said case, said restraining means maintaining a longitudinal axis of said vibratory element parallel to said case axis; and
    displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and wherein
    said two sensors are disposed on said case axis at opposite ends of a path of displacement of said vibratory element each of said sensors including means for illuminating an end portion of said vibratory element with light rays directed in a direction normal to said one direction of motion of said vibratory element, an intrusion of said vibratory element into the light rays of a sensor providing an indication of displacement of said vibratory element.

2. A vibration measurement transducer comprising:
    an elongated vibratory element having predetermined mass;
    a case enclosing said element;
    suspension means for mechanically coupling the element to said case, the suspension means permitting displacement of said element relative to said case in response to a vibration applied to said case;
    restraining means operatively connected to said suspension means for restraining displacement of said element to one direction of motion parallel to an axis of said case, said restraining means maintaining a longitudinal axis of said vibratory element parallel to said case axis; and
    displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and wherein
    said two sensors are disposed to sense across said case axis at opposite ends of a path of displacement of said vibratory element;
    each of said sensors comprises a source of light, a detector of light, means for directing the light from said source to said detector; and wherein
    in each of said sensors, said source and said detector are mounted to an interior wall of said case, there being modulation means disposed on opposite ends of said vibratory element for modulating power transmitted by a beam of light from said source to said detector, said modulation means being activated by vibration of said vibratory element, said detector in each of said sensors outputting an electric signal to said combining means.

3. A transducer according to claim 2 wherein at each of said sensors said modulation means comprise a vane extending from an end portion of said vibratory element into a path of light propagating between said source and said detector, the amount of modulation being dependent on a vibratory displacement of the vane into the path of light.

4. A transducer according to claim 2 wherein said combining means is an electric circuit comprising an operational amplifier having an inverting input and a noninverting input for receiving signals of respective ones of said sensors, the inverting and noninverting inputs cancelling phase differences in modulations of signals outputted by said sensors to said combining means.

5. A vibration measurement transducer comprising:
a vibratory element having predetermined mass;
a case enclosing said element;
suspension means for mechanically coupling the element to said case, the suspension means permitting displacement of said element relative to said case in response to a vibration applied to said case;
restraining means operatively connected to said suspension means for restraining displacement of said element to one direction of motion parallel to an axis of said case, said restraining means maintaining a longitudinal axis of said vibratory element parallel to said case axis; and
displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and
wherein said two sensors are disposed to sense across said case axis at opposite ends of a path of displacement of said vibratory element;
each of said sensors comprises a source of light, a detector of light, means for directing the light from said source to said detector;
in each of said sensors, said source and said detector are mounted to an interior wall of said case, there being modulation means disposed on opposite ends of said vibratory element for modulating power transmitted by a beam of light from said source to said detector, said modulation means being activated by vibration of said vibratory element, said detector in each of said sensors outputting an electric signal to said combining means; and
said suspension means is a disk spring having a predetermined stiffness, the stiffness of the spring and the mass of the vibratory element being selected to produce a resonance frequency of the vibratory element which lies above a spectrum of interest in a measurement of vibration by said transducer, thereby rendering vibrational motion of said vibratory element responsive to acceleration of said transducer case in response to measurement of external vibration.

6. A vibration measurement transducer comprising:
a vibratory element having predetermined mass;
a case enclosing said element;
suspension means for mechanically coupling the element to said case, the suspension means permitting displacement of said element relative to said case in response to a vibration applied to said case;
restraining means operatively connected to said suspension means for restraining displacement of said element to one direction of motion relative to an axis of said case; and
displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and
wherein each of said sensors comprises a coil of electrically conductive wire and a magnet producing a flux in said coil, end portions of said vibratory element being constructed of magnetic flux conducting material spaced apart from the coil by a gap; and wherein
vibrational movement of said vibratory element modulates the gap width in each of said sensors resulting in a variation of flux in the coil of each sensor to induce a voltage at output terminals of the coil, the output voltage of the coil in each of said sensors being applied to said combining means.

7. A transducer according to claim 6 wherein said suspension means is a disk spring having a predetermined stiffness, the stiffness of the spring and the mass of the vibratory element being selected to produce a resonant frequency of the vibratory element which lies above a spectrum of interest in a measurement of vibration by said transducer, thereby rendering vibrational movement of the vibratory element responsive to velocity of said transducer case in response to measurement of external vibration.

8. A vibration measurement transducer comprising:
a vibratory element having predetermined mass;
a case enclosing said element;
suspension means for mechanically coupling the element to said case, the suspension means permitting displacement of said element relative to said case in response to a vibration applied to said case;
restraining means operatively connected to said suspension means for restraining displacement of said element to one direction of motion parallel to an axis of said case, said restraining means maintaining a longitudinal axis of said vibratory element parallel to said case axis; and
displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and
wherein said two sensors are disposed to sense across said case axis at opposite ends of a path of displacement of said vibratory element;
each of said sensors comprises a source of light, a detector of light, means for directing the light from said source to said detector;

in each of said sensors, said source and said detector are mounted to an interior wall of said case, there being modulation means disposed on opposite ends of said vibratory element for modulating power transmitted by a beam of light from said source to said detector, said modulation means being activated by vibration of said vibratory element, said detector in each of said sensors outputting an electric signal to said combining means; and said suspension means is a disk spring, said vibratory element has an elongated shape and is mounted centrally to and transversely of said disk spring, said restraining means comprising a circumferential slot in an inner wall of said case for receiving a peripheral edge of said disk spring and fixedly securing said peripheral edge to said case.

9. A vibration measurement transducer comprising:

a vibratory element having predetermined mass;

a case enclosing said element;

suspension means for mechanically coupling the element to said case, the suspension means permitting displacement of said element relative to said case in response to a vibration applied to said case;

restraining means operatively connected to said suspension means for restraining displacement of said element to one direction of motion relative to an axis of said case;

displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and wherein said suspension means is a disk spring having a predetermined stiffness, the stiffness of the spring and the mass of the vibratory element being selected to produce a resonance frequency of the vibratory element which lies above a spectrum of interest in a measurement of vibration by said transducer, thereby rendering vibrational motion of said vibratory element responsive to acceleration of said transducer case in response to measurement of external vibration;

each of said sensors comprises a source of light, a detector of light, means for directing the light from said source to said detector;

in each of said sensors, said source and said detector are mounted to an interior wall of said case, there being modulation means disposed on opposite ends of said vibratory element for modulating power transmitted by a beam of light from said source to said detector, said modulation means being activated by vibration of said vibratory element, said detector in each of said sensors outputting an electric signal to said combining means;

at each of said sensors, said modulation means comprises a vane extending from an end portion of said vibratory element into a path of light propagating between said source and said detector, the amount of modulation being dependent on a vibratory displacement of the vane into the path of light;

said vibratory element has an elongated shape and is mounted centrally to and transversely of said disk spring, said restraining means comprising a circumferential slot in an inner wall of said case for receiving a peripheral edge of said disk spring and fixedly securing said peripheral edge to said case; and said combining means is an electric circuit comprising an operational amplifier having an inverting input and a noninverting input for receiving signals of respective ones of said sensors, the inverting and noninverting inputs canceling phase differences in modulations of signals outputted by said sensors to said combining means.

10. A vibration measurement transducer comprising:

a vibratory element having predetermined mass;

a case enclosing said element;

suspension means for mechanically coupling the element to said case, the suspension means permitting displacement of said element relative to said case in response to a vibration applied to said case;

restraining means operatively connected to said suspension means for restraining displacement of said element to one direction of motion relative to an axis of said case;

displacement sensor means disposed within said case for sensing displacement of said element relative to said case, the sensor means comprising two sensors located relative to said element for sensing displacement of opposite ends of said element, the sensor means further comprising means for algebraically combining signals of the two sensors for improved signal-to-noise ratio; and wherein said suspension means is a disk spring having a predetermined stiffness, the stiffness of the spring and the mass of the vibratory element being selected to produce a resonance frequency of the vibratory element which lies above a spectrum of interest in a measurement of vibration by said transducer, thereby rendering vibrational movement of the vibratory element responsive to displacement of said transducer case in response to measurement of external vibration;

each of said sensors comprises a coil of electrically conductive wire and a magnet producing a flux in said coil, end portions of said vibratory element being constructed of magnetic flux conducting material spaced apart from the coil in one of said sensors by a gap;

vibrational movement of said vibratory element modulates the gap width in each of said sensors resulting in a variation of flux in the coil of each sensor to induce a voltage at output terminals of the coil, the output voltage of the coil in each of said sensors being applied to said combining means;

said vibratory element has an elongated shape and is mounted carefully to and transversely of said disk spring, said restraining means comprising a circumferential slot in an inner wall of said case for receiving a peripheral edge of said disk spring and fixedly securing said peripheral edge to said case; and said combining means is an electric circuit comprising an operational amplifier having an inverting input and a noninverting input for receiving signals of respective ones of said sensors, the inverting and noninverting inputs canceling phase differences in modulations of signals outputted by said sensors to said combining means.

* * * * *